July 24, 1951         P. A. SOURIAU         2,561,677
CONNECTOR HAVING A LOCKING RING CAMMING THE MEMBERS
INTO THE ENGAGED AND DISENGAGED POSITIONS
Filed Jan. 23, 1947         3 Sheets-Sheet 1
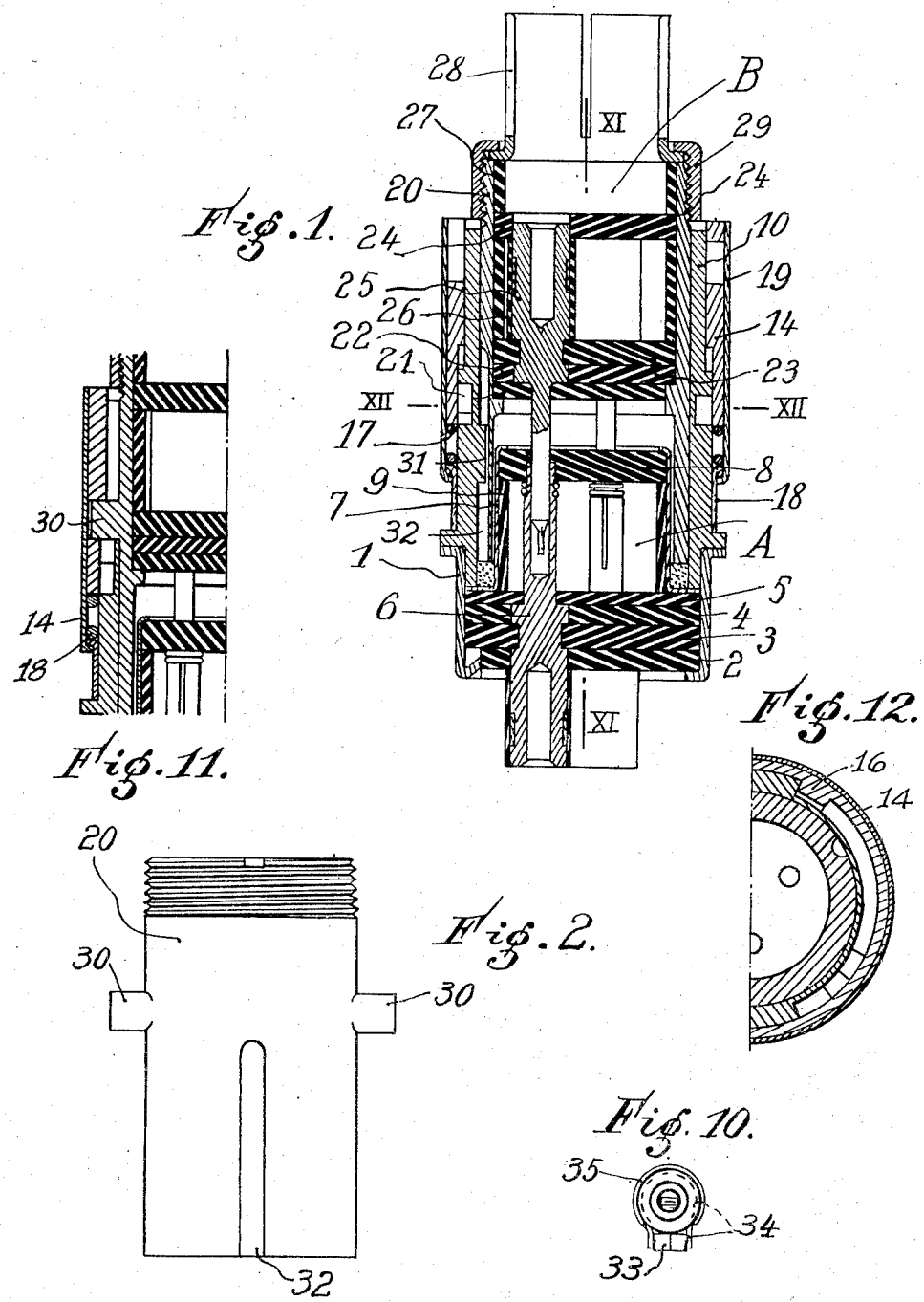
INVENTOR
PAUL A. SOURIAU
BY Young, Emery & Thompson
ATTYS.

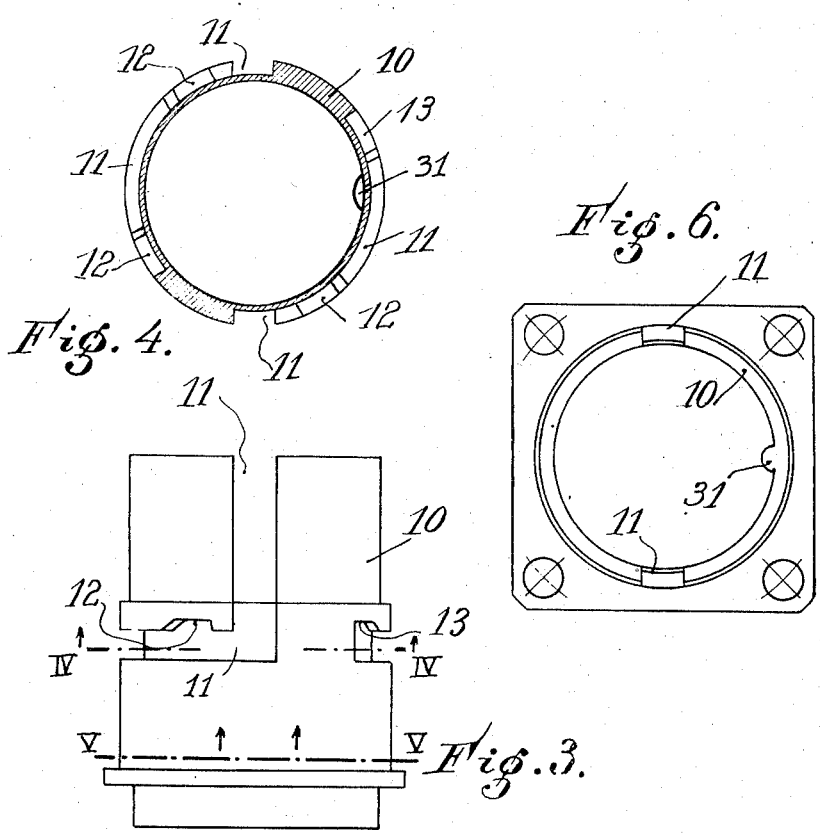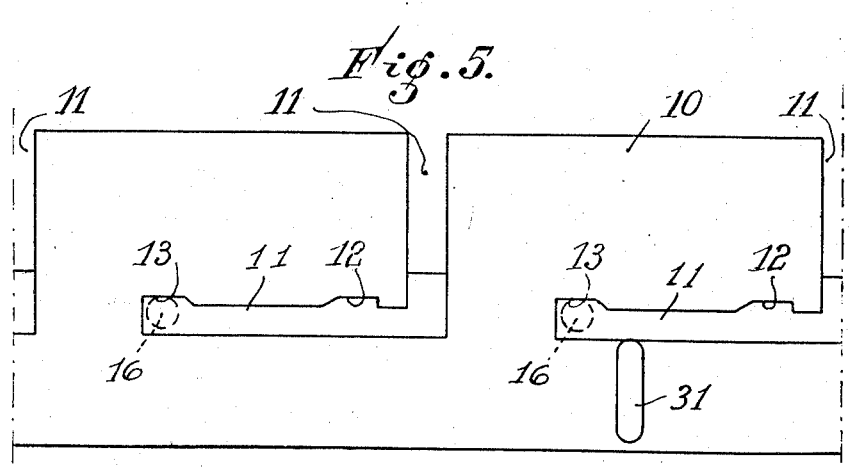

Patented July 24, 1951

2,561,677

UNITED STATES PATENT OFFICE 2,561,677

CONNECTOR HAVING A LOCKING RING CAMMING THE MEMBERS INTO THE ENGAGED AND DISENGAGED POSITIONS

Paul Adolphe Souriau, Billancourt, France

Application January 23, 1947, Serial No. 723,767
In France September 4, 1942

Section 1, Public Law 690, August 8, 1946
Patent expires September 4, 1962

3 Claims. (Cl. 173—328)

My invention refers to electrical connections and deals more especially with current supply means that may be quickly connected and disconnected under perfectly secure conditions particularly adaptable where they are hard to get at and where there are many set close together.

The invention has for its object to provide such connections of which the movable piece may be connected quickly, reliably and safely in the corresponding stationary piece, while remaining protected against any undesired disconnection.

The invention is distinguished mainly by the fact that the movable portion comprises some means such as a stud or studs or similar means, that the fixed portion includes a kind of bayonet member of which the one or more slots include securing notches and a movable locking ring with one or more spiral grooves in which this stud or studs are held, the ring itself comprising studs or similar means adapted to move in the annular portion of the slot or slots of the bayonet member and falling automatically into its or their notches at its or their end of travel under the action of elastic means acting on the movable ring.

The invention has for its object, in addition to its main arrangement, other arrangements that will be disclosed later and that may be employed at the same time.

The invention will be more clearly understood by the help of the following description referring to accompanying drawings in which Fig. 1 is a longitudinal axial cross-section through the connector according to my invention, said cross-section passing through the rib thereon.

Fig. 2 is an elevational view of the inner or plug element thereof.

Fig. 3 is an elevational view of the socket element of the connector.

Fig. 4 is a sectional view through line IV—IV of Fig. 3 of said socket element.

Fig. 5 is a developed view of the upper part of the same element above the section line V—V.

Fig. 6 is a plan view of the socket element.

Fig. 10 is a plan view of the breaking means associated with the screws locking the electric leads.

Fig. 11 is a fraction of a cross-section of the connector in a plane perpendicular to Fig. 1 and passing through the studs thereon along line XI—XI of Fig. 1.

Fig. 12 is a half section of the connector through the locking pins thereof along line XII—XII of Fig. 1.

Figure 7:
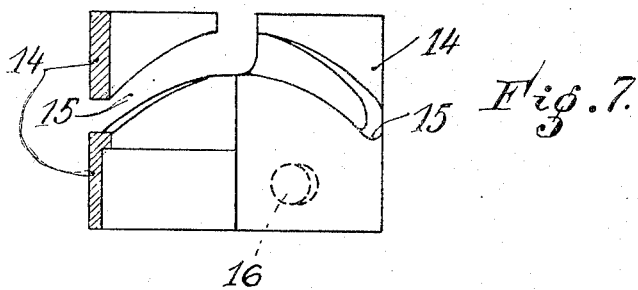
Fig. 7 is a partly sectional elevational view of the third or locking ring element taken on line VII—VII of Fig. 8.
Figure 8:
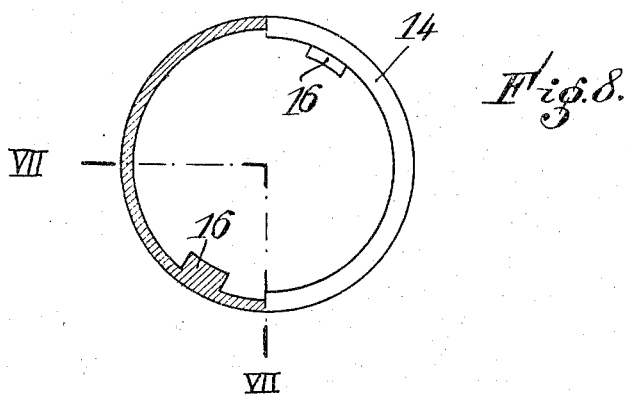
Fig. 8 is a plan view partly sectional of the ring element.
Figure 9:
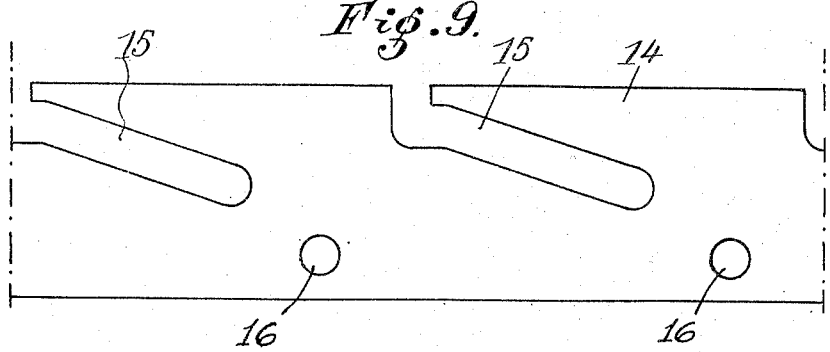
Fig. 9 is a developed view of said ring element.

According to the invention, and as shown in Fig. 1 of the drawings, the fixed connection or socket A comprises a base-piece 1 in which are housed insulating plates 2, 3, 4, 5 acting respectively as supporting means, for fixing, for joining-up and for protecting the inside and acting as a bearing for socket member 6. A dished portion 7 holds inside it a small plate 8 that bears on a tubular spacer 9. A body 10 rigid with the preceding elements is provided with two bayonet slots 11 each comprising in their annular portion rest notches 12 and 13 (Fig. 5). A movable ring 14 has two spiral slots 15 and two pins or lugs 16, adapted to cooperate with the bayonet slots 11. A spring 17 bears on a dished portion 18 fitted over the body 10. An outer sleeve 19 is rigidly secured to the ring 14.

On the other hand the movable connection or plug element B comprises a body 20 in which are housed insulating plates 21, 22, 23, 24 acting respectively as a protection for joining-up and for fixing. These small plates act also as a bearing for pins 25 adapted to engage the sockets 6 of the fixed connection or socket element A. A protecting sleeve 28 and a tubular spacer 27 are also provided on the element B.

This movable connection B comprises in the example illustrated a connecting enclosing sleeve 26 held by a nut which forms the assembling nut 29 of the movable connection described.

The body 20 (Fig. 2) of the movable connection carries studs or lugs 30 adapted to engage simultaneously the spiral slots 15 and the bayonet slots 11. As the drawing shows the body of the fixed connection 10 has a small rib 31 while the body of the movable connecting piece 20 has a longitudinal groove 32, which rib and groove are designed according to the system disclosed in the French patent of January 19, 1942, in the name of Etablissements P. Souriau & Co. for "Improvements in Means Used for Cutting and Connecting Mains, Especially Electric Conduits." This system in the case of a single conduit, as in the case of a conduit forming part of a series of mains, leaves no chance of mistake when inserting the pins or plugs in the sockets and therewith engaging movable connections with those that are fixed.

The working of the electric connection described above is very easy to understand. In fact it may be realized, merely by an examination of the drawings, that if the plug or movable part of the connection is properly inserted in the corresponding socket portion that is to say if the groove 32 of the body 20 is held in such a way that the small rib 31 in the body 10 enters this groove 32, the studs 30 of the body 20 appear in front of the open ends of the longitudinal parts of the bayonet slots 11 of the body 10 and of the slots 15 of the ring 14, the plug or movable part and ring 14 are very slightly pressed in while the sleeve 19 is angularly shifted with the ring 14 rigid with said sleeve; by doing this the plug or movable connection is pressed into the socket portion along the spiral slots 15, while the ring 14 turns and its studs or lugs 16 slide inside the horizontal portion of the bayonet slots 11 of the body 10 and at the end of their travel, under the thrust of the spring 17 acting on the ring 14 engage the notches 13. In order to disengage the plug or movable part of the connection, it is sufficient to turn the sleeve 19 in the reverse direction, the studs 16 of the ring 14 are then housed in the notches 12 of the horizontal portion of the slots 11, the longitudinal opening portions of the slots 11 and 15 register, and the movable part may then be drawn out of the fixed part.

An advantageous feature, as shown in the drawings consists in that the dished piece 18 and the sleeve 19 are fitted together in such a way that the outwardly extending flange of this dished piece is caught in the inwardly extending flange of the sleeve 19.

The electric connection that has been described has been assumed to have its fixed part connection attached to a panel such for instance as the fire-proof bulkhead panel of an aerial navigation engine; it is clear that this connection may be formed so as to play the part of an electric extension piece with the portion A the female part of it and the portion B its male counterpart.

A favourable point also consists in that the locking screws 33 of the leads in the female sockets 6 and in the pins 25 are furnished with braking means constituted by a small elliptic spring 34 of which the arms encircle the polygonal heads of these screws 33, as shown in Fig. 10, and these braking means are furnished with an insulating protecting sleeve 35, chiefly when several plugs are to lie close together.

The invention is not restricted to the forms of invention that have been disclosed hereinabove, and as illustrated in the drawings, and it takes in all its modifications.

The invention embraces the new commercial manufactured articles formed by electric connections based on the invention as well as the different component parts of these electric connections.

What I claim is:

1. An electrical connector comprising a stationary socket body provided with an axial slot opening into the outer edge of the wall of said socket body and a groove parallel to said edge on the outer surface of the periphery of the socket starting from the inner end of said slot and provided with stop notches directed towards the upper edge of said socket and opening into said groove respectively near the slot end thereof and at the opposite end of said groove, an electrical contact element fitted rigidly inside said socket body, a ring revolubly carried by said socket body and including a lug extending inwardly of said ring and adapted to engage slidingly the axial slot and groove in the socket body, said ring being provided with an inner groove having a short axially extending portion opening into the outer end of the ring and a helical portion extending beyond the inner end of said axial portion in a direction opposed to the lug, said helical portion of the ring groove registering with the axial slot in the socket body when the lug on the ring engages the groove in the said socket body between the two stop notches thereof, yielding means urging the ring outwardly by a slight extent with reference to the groove in the socket, a plug body slidingly engaging the socket including a stud adapted to engage permanently the axial slot in the socket body and the helical groove in the ring when said slot and groove register and to rest on the outer edge of the ring as long as the outer end of the axial slots in the socket and in the ring are not in register, and an electrical contact element rigidly fitted inside the plug body and engageable with the electric contact element carried by the socket body.

2. An electrical connector comprising a stationary socket body provided with two diametrically opposed axial slots opening into the outer edge of the wall of said socket body and with two grooves parallel to said edge on the outer surface of the periphery of the socket starting from the inner end of each slot and each including two stop notches directed towards the upper edge of said socket and opening into said grooves respectively near the slot end thereof and at the opposite end of said grooves, an electrical contact element fitted rigidly inside said socket body, a ring revolubly carried by said socket body and including two diametrically opposed lugs extending inwardly of said ring and adapted to engage slidingly the corresponding axial slot and groove in the socket body, said ring being provided with two diametrically opposed inner grooves each having a short axially extending portion opening into the outer edge of the ring and a helical portion extending beyond the inner end of said axial portion in a direction opposed to the corresponding lug, said helical portions of the ring grooves crossing the axial slots in the socket body when the lugs on the ring engage the grooves in the said socket body between the two stop notches thereof, yielding means urging the ring outwardly by a slight extent with reference to the grooves in the tubular socket, a plug body slidingly engaging the socket and including two diametrically opposed studs adapted to engage permanently the axial slots in the socket body and the helical grooves in the ring when said slots and grooves register, and to rest on the outer edge of the ring as long as the outer ends of the axial slots in the socket and in the ring are not in register, an electrical contact element rigidly fitted inside the plug body and engageable with the electrical contact element carried by the socket body and interengaging means on the cooperating surfaces of the plug and socket bodies for defining in cooperation with the studs the angular location of the plug body with reference to the socket body.

3. An electrical connector comprising a stationary socket body provided with a slot opening axially into the outer edge of the wall of said socket body and having an extension at right angles along a line substantially parallel with the periphery of the socket starting from the inner end of said slot, a stop notch directed towards the upper edge of said socket opening into said extension at the end thereof, remote from the axial portion of the slot, an electrical contact element fitted rigidly inside said socket body, a ring revolubly carried by said socket body and including a lug extending inwardly of said ring and adapted to engage slidingly the axial portion of the slot in the socket body, said ring being provided with an inner helical groove opening into the outer end of the ring to register with the axial slot in the socket body when the lug on the ring engages the slot extension in the said socket body, yielding means urging the ring outwardly, a plug body slidingly engaging the socket and including a stud adapted to engage permanently the axial slot in the socket body and the helical groove in the ring when said slot and groove register, and an electrical contact element rigidly fitted inside the plug body and engageable with the electrical contact element carried by the socket body.

PAUL ADOLPHE SOURIAU.

REFERENCES CITED

The following references are of record in the file of this patent:

UNITED STATES PATENTS

| Number | Name | Date |
|---|---|---|
| 1,885,321 | Benn | Nov. 1, 1932 |
| 1,899,119 | Singer | Feb. 28, 1933 |
| 2,114,258 | Tornblom | Apr. 12, 1938 |

FOREIGN PATENTS

| Number | Country | Date |
|---|---|---|
| 179,292 | England | May 2, 1922 |
| 553,892 | Germany | June 16, 1932 |